(12) United States Patent
Simpson

(10) Patent No.: US 8,597,402 B2
(45) Date of Patent: Dec. 3, 2013

(54) DEVICE FOR CAPTURING GAS FROM A PRODUCED WATER STREAM

(71) Applicant: David A. Simpson, Farmington, NM (US)

(72) Inventor: David A. Simpson, Farmington, NM (US)

(73) Assignee: David A. Simpson and Janet K. Simpson, Farmington, NM (US), As Co-Trustees of the Simpson Living Trust, U/A ( * ) Notice: Subject to any disclaimer, the term of this patent is extended or adjusted under 35 U.S.C. 154(b) by 0 days.

(21) Appl. No.: 13/856,670

(22) Filed: Apr. 4, 2013

(65) Prior Publication Data

US 2013/0220117 A1    Aug. 29, 2013

Related U.S. Application Data

(63) Continuation-in-part of application No. 13/243,673, filed on Sep. 23, 2011, now Pat. No. 8,439,999.

(51) Int. Cl.
*B01D 19/00* (2006.01)

(52) U.S. Cl.
USPC ... 95/24; 95/261; 96/159; 96/212; 166/75.12; 166/267

(58) Field of Classification Search
USPC ........ 95/261, 24; 96/159, 160, 161, 212, 211, 96/210; 166/75.12
See application file for complete search history.

(56) References Cited

U.S. PATENT DOCUMENTS

| RE20,051 E | 7/1936 | Walker | |
|---|---|---|---|
| 2,104,759 A | * 1/1938 | Randel | 95/263 |
| 2,291,902 A | 8/1942 | Kelley | |
| 2,487,876 A | 11/1949 | Johnson | |
| 2,681,150 A | 6/1954 | Reid | |
| 3,021,709 A | * 2/1962 | Walker et al. | 73/200 |
| 3,324,803 A | 6/1967 | Kelley et al. | |
| 3,363,581 A | 1/1968 | Kelley et al. | |
| 3,410,217 A | 11/1968 | Kelley et al. | |
| 3,451,477 A | 6/1969 | Kelley | |
| 3,643,740 A | 2/1972 | Kelley | |

(Continued)

OTHER PUBLICATIONS

Wang, S. et al., "Dynamic Simulation and Control-System Design for Gas/Liquid Cylindrical Cyclone Separators", SPE Journal, Jun. 1, 2001, pp. 236-247, vol. 6, No. 2, Publisher: Society of Petroleum Engineers.

*Primary Examiner* — Duane Smith
*Assistant Examiner* — Douglas Theisen
(74) *Attorney, Agent, or Firm* — Fellers, Snider, Blankenship, Bailey & Tippens, P.C.

(57) ABSTRACT

A flushable device for capturing gas included within a produced-water stream is described. Gas and water pressure coordination is not required. Controls prevent liquid entry to the gas system and prevent gas entry into the water system. A gas/liquid separator receives an inner vessel lower end. A separator inlet receives a combined fluid stream. A liquid line passes into the inner vessel and down into the separator below the inlet so that liquid separated from the combined stream will flow up the liquid line. The gas line extends from the inner vessel upper end. The gas line conveys gas from the inner vessel upper end to a gas collection system. A top float in the inner vessel activates a gas line motor valve. A bottom float in the inner vessel activates the liquid line motor valve and a second gas vent for rapid expulsion of slugs of gas.

15 Claims, 9 Drawing Sheets

(56) References Cited

U.S. PATENT DOCUMENTS

| | | |
|---|---|---|
| 3,759,324 A | 9/1973 | Mecusker |
| 4,428,839 A * | 1/1984 | Davies et al. .................... 95/253 |
| 4,475,932 A | 10/1984 | Hull et al. |
| 4,555,253 A | 11/1985 | Hull et al. |
| 4,617,031 A | 10/1986 | Suh et al. |
| 4,723,970 A | 2/1988 | Yokoyama |
| 5,338,341 A | 8/1994 | Mazzei et al. |
| 5,622,545 A | 4/1997 | Mazzei et al. |
| 5,900,137 A * | 5/1999 | Homan ............................ 210/85 |
| 6,089,322 A | 7/2000 | Kelley et al. |
| 6,776,823 B2 | 8/2004 | Hotta et al. |
| 6,843,832 B2 | 1/2005 | Greene et al. |
| 7,144,503 B2 * | 12/2006 | Oserod ....................... 210/221.2 |
| 7,638,062 B2 | 12/2009 | Movafaghian et al. |
| 8,496,740 B1 * | 7/2013 | Ball, IV .......................... 96/183 |
| 2013/0199368 A1 * | 8/2013 | Tremblay et al. .................... 95/1 |

* cited by examiner

US 8,597,402 B2

DEVICE FOR CAPTURING GAS FROM A PRODUCED WATER STREAM

CROSS REFERENCE TO RELATED APPLICATIONS

This application is a Continuation-in-Part of U.S. Utility patent application Ser. No. 13/243,673, filed Sep. 23, 2011, entitled, "DEVICE FOR CAPTURING GAS FROM A PRODUCED WATER STREAM," which claims the priority of U.S. Provisional Patent Application No. 61/389,473 entitled "DEVICE FOR CAPTURING GAS IN A WELL PRODUCING GAS AND LIQUID MIXTURE," filed Oct. 4, 2010, the contents of both of which are hereby incorporated by reference.

FIELD OF THE INVENTION

The invention relates to a liquid and gas separator. More particularly, the invention relates to a device that allows the capture, for sale, of gas without venting the gas to the atmosphere and that allows coordination of gas and liquid pressures while preventing liquid entry to a gas system and preventing gas entry into a water system.

BACKGROUND OF THE INVENTION

Produced liquid systems used with gas wells regularly contain some amount of included gas. Gas interferes with the performance of liquid gathering systems. The gas must, therefore, be vented to the atmosphere either through collection tanks or through "air eliminator" devices that exhaust the gas to the atmosphere. However, venting the gas converts it from a valuable commercial product into a pollution stream.

Accumulation of gas within a water gathering system increases gathering system pressure by splitting the liquid stream. Gas accumulation additionally prevents pressure recovery on the downhill side of hills, which requires that supply pressure be equal to a hydrostatic head that is the aggregated sum of all uphill traverses within the gathering system. Removing the accumulated gas from the system allows the liquid on the downhill portion of the system to "pull" the liquid on the uphill portion, significantly lowering required supply pressure.

SUMMARY OF THE INVENTION

The device of the invention is designed to remove gas from a produced water stream. The device may be installed either as part of production equipment at a wellsite with a downhole pump or as part of gathering equipment on a produced water gathering system.

When installed at a wellsite, the device is installed on a line from the pump discharge, i.e., on the tubing line. The pump discharge is piped to a tangential entry on the outer vessel of the device. Accumulated gas is extracted from a top of the inner vessel of the device. The accumulated gas is exhausted to the tubing-casing annuls on the wellhead or to a production separator. Degassified water may be discharged to a tank or to a produced-water gathering system.

When installed on a produced-water gathering system, the device is installed in line with the produced-water pipe. Upstream piping is connected to the tangential entry on the outer vessel of the device. The water outlet of the device is piped into the produced-water pipe. Gas from the top of the inner vessel of the device is piped to a gas gathering system.

In general, the device of the invention is intended to process a fluid stream from a produced water flow line that includes some amount of produced gas. In greater detail, a combined stream tangentially enters an outer vessel of the device to begin flow spinning in an annular space between inner and outer vessels. This flow profile will tend to separate gases from liquids and allow the gases to rise into the top of the inner vessel. Liquids will continue to the bottom of the vessel where a pipe extension called a "stinger" is used to direct the liquid from the bottom of the vessel to a water collection system or tank through a motorized valve and a non-return valve.

Gas accumulates in the top of the vessel against a normally closed motor valve. When enough gas accumulates to displace adequate liquid to change the state of a top float from "floating" to "not floating", the gas motor valve is opened to allow accumulated gas to exit into a gas collection system. As the gas exits, the liquid is able to reenter the top of the vessel and return the top float to "floating" and close the gas valve.

The device of the invention operates in two modes: (1) water system pressure higher than gas system pressure; and (2) gas system pressure higher than water system pressure. The two modes differ in the driving force for fluid movement. In mode "1", excess pressure in the vessel from the water system over the gas system pressure is used to push the gas into the gas collection system. In mode "2", excess pressure in the vessel from the gas system is used to push the liquid into the water system. In mode "2", the liquid level is maintained at the point that the lower float regularly switches between "floating" and "not floating". When enough liquid comes into the vessel to float the lower float then the lower motor valve opens and gas system pressure pushes the liquid into the water system. As that liquid leaves, the liquid level will drop and the lower float will move from "floating" to "not floating" and the lower motor valve will shut.

A difference between these two modes of operation is that, in mode "1", the upper float and the upper valve operate frequently. The lower float and lower valve operate only when a very large slug of gas enters the vessel and the lower motor valve is shut to prevent gas from entering the water system. In mode "2", the liquid level is maintained at the level of the lower float, which will operate frequently.

The device of the invention is designed to allow the capture, for later sale, of gas always included within a produced-water gathering system without venting gas to the atmosphere. The device allows gas and produced water collection systems to be at whatever pressure each system needs to be without requiring coordination of those pressures. The device has controls to prevent liquid entry to the gas system and to prevent gas entry into the water system.

The device of the invention is preferably installed at a gas well or on a water gathering system. The device includes an inner vessel having a sidewall, an upper end, and a lower end. A gas/liquid separator receives the lower end of the inner vessel. The gas/liquid separator has an inlet for admitting a combined fluid stream into the gas/liquid separator. A liquid line passes through the sidewall of the inner vessel and down through the inner vessel into the gas/liquid separator. The liquid line forms a stinger that extends below the inlet of the gas/liquid separator so that liquid separated from the combined stream will flow up the liquid line. The liquid line has an exit end. A liquid line motor valve is located in the liquid line. A gas line extends from the upper end of the inner vessel. The gas line is in communication with a gas collection system for conveying gas from the upper end of the inner vessel to the gas collection system. A gas line motor valve is located in the gas line. A top float is located in the inner vessel for activating the gas line motor valve. A bottom float is located in the inner vessel for activating the liquid line motor valve.

In use, the collection of gas and liquid from a well includes receiving a combined stream of liquid and gas in an outer vessel. The gas and liquid are separated from the combined stream in the outer vessel. The gas is collected in an upper portion of an inner vessel to a location above a gas/liquid interface. A top float in the inner vessel is provided for responding to a level of the gas/liquid interface. A bottom float is provided in the inner vessel for responding to a level of the gas/liquid interface. A gas line motor valve is closed when the top float is in a floating position for trapping gas within the upper portion of the inner vessel. A non-return valve is opened when gas pressure within the upper portion of the inner vessel exceeds a pressure in a liquid receiver, such as a water pressure system or tank. A gas line motor valve is opened when the top float is in a non-floating position for allowing the gas to flow through a gas line to a gas collection system. When the bottom float is floated by the gas/liquid interface, a liquid line motor valve is opened delivering liquid to the liquid line. The liquid line motor valve closes in response to the bottom float moving to a non-floating position for protecting a liquid receiver from incursion of gas via the liquid line.

DETAILED DESCRIPTION OF THE PREFERRED EMBODIMENTS

Figure 1:
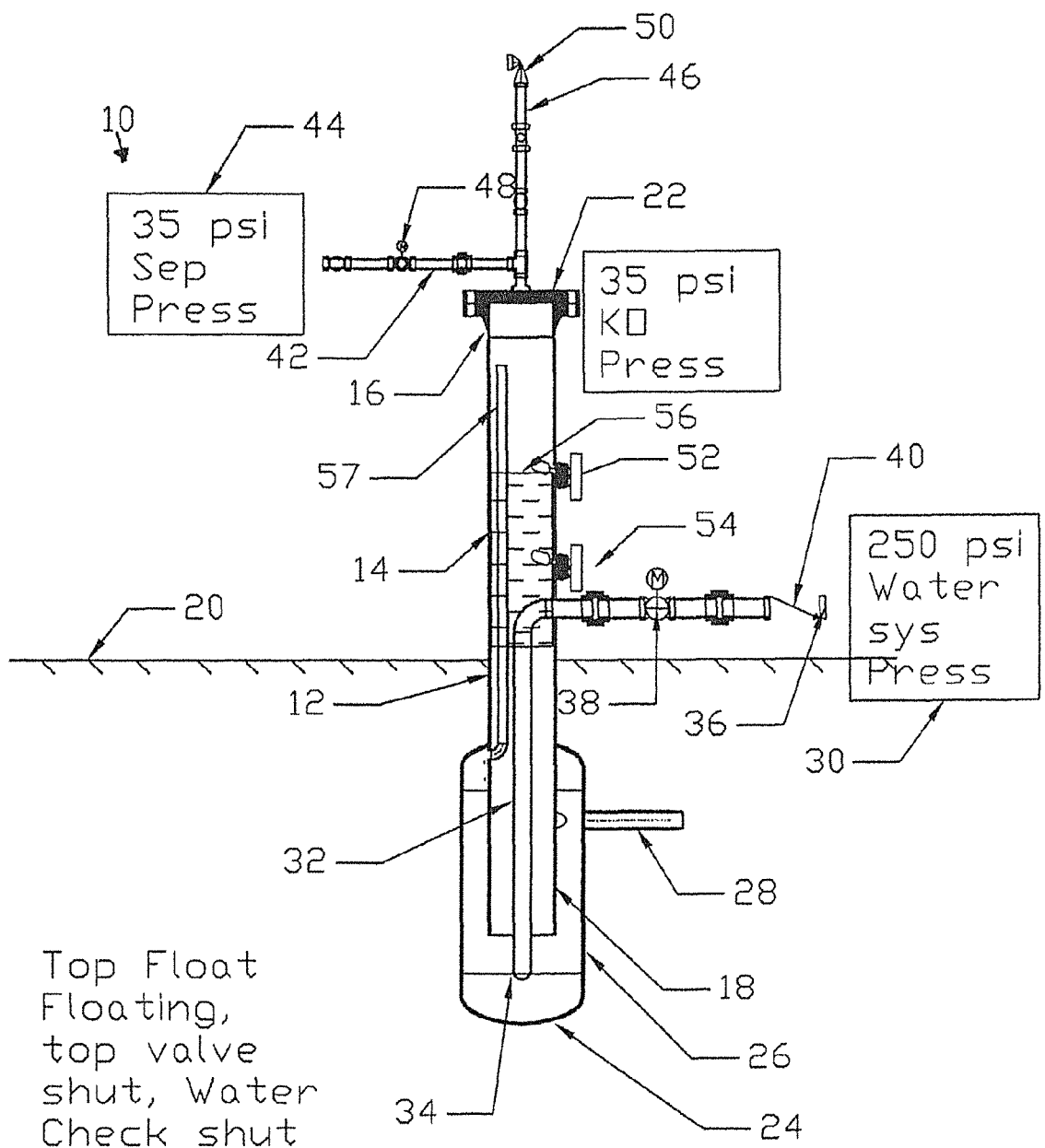
FIG. 1 shows the device of the invention in mode 1, i.e., wherein the liquid pressure is higher than the gas pressure, wherein the top float is floating, the gas line motor valve is closed, and the water line non-return valve is closed.

Referring now to FIGS. 1-6, shown is a gas capturing device generally 10. Device 10 includes an inner vessel 12 having sidewall 14 and upper end 16 and a lower end 18. Inner vessel 12 extends downwardly from ground surface 20. A cap member 22 is provided on upper end 16 of inner vessel 12.

A cylindrical outer vessel 24 has a housing 26 having a diameter greater than a diameter of inner vessel 12. Outer vessel 24 receives lower end 18 of inner vessel 12 in a top portion of outer vessel 24.

An inlet passageway 28 is tangentially oriented with respect to outer vessel 24. Inlet passageway 28 extends through housing 26 of outer vessel 24 for admitting a combined gas and liquid stream into outer vessel 24.

Liquid is collected in liquid piping 30 from the bottom of outer vessel 24. Liquid piping 30 may lead to or include a tank or water gathering system. A liquid line 32 passes through side wall 14 of inner vessel 12 and down through inner vessel 12 into outer vessel 24. Liquid line 32 forms a stinger 34 that extends below inlet passageway 28 so that gas separated from the combined stream will flow up outer vessel 24 above gas/liquid interface 56 through standpipe 57 to the top of inner vessel 12. Liquid line 32 has an exit end 36 that communicates with liquid piping 30. A liquid motor valve 38 is provided in liquid line 32. A non-return valve 40 is also provided in liquid line 32 to prevent liquid from liquid piping 30 from flowing back into outer vessel 24.

A gas line 42 extends from cap member 22 on upper end 16 of inner vessel 12. Gas line 42 is provided for conveying gas from upper end 16 of inner vessel 12 to gas collection system 44. Gas collection system 44 may include offsite caching, a wellhead annulus or a production separator. A pressure relief line 46 is in communication with upper end 16 of inner vessel 12. A gas line motor valve 48 is provided in gas line 42. A pressure relief valve 50 is provided in pressure relief line 46. A top float 52 is provided in inner vessel 12 for activating gas line motor valve 48 and a bottom float 54 is provided in inner vessel 12 for activating liquid line motor valve 38.

Figure 4:
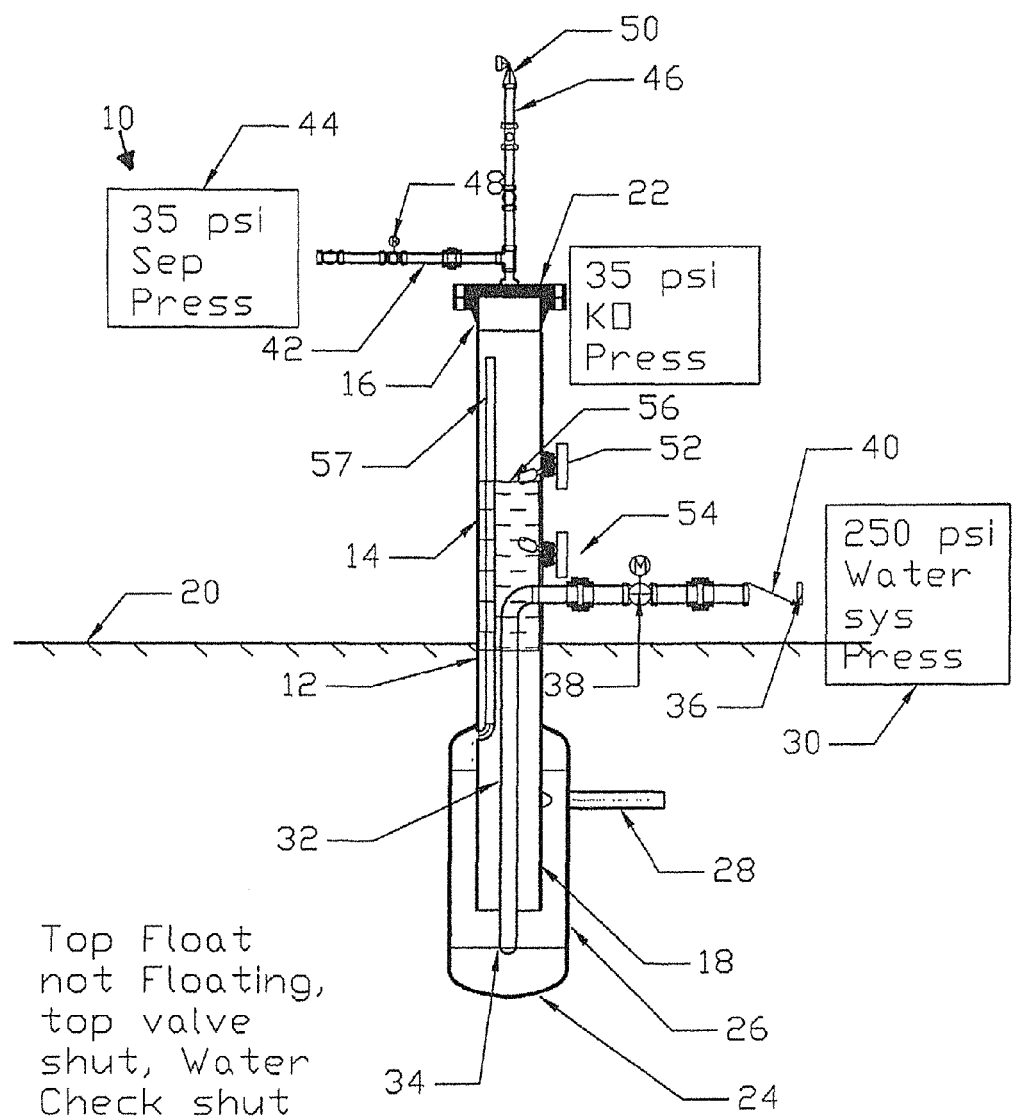
FIG. 4 shows the device of FIG. 1 in mode 1, i.e., wherein the vessel pressure is higher than the gas pressure, wherein the top float is not floating, the gas line motor valve is open, and the water line non-return valve is closed.
Figure 5:
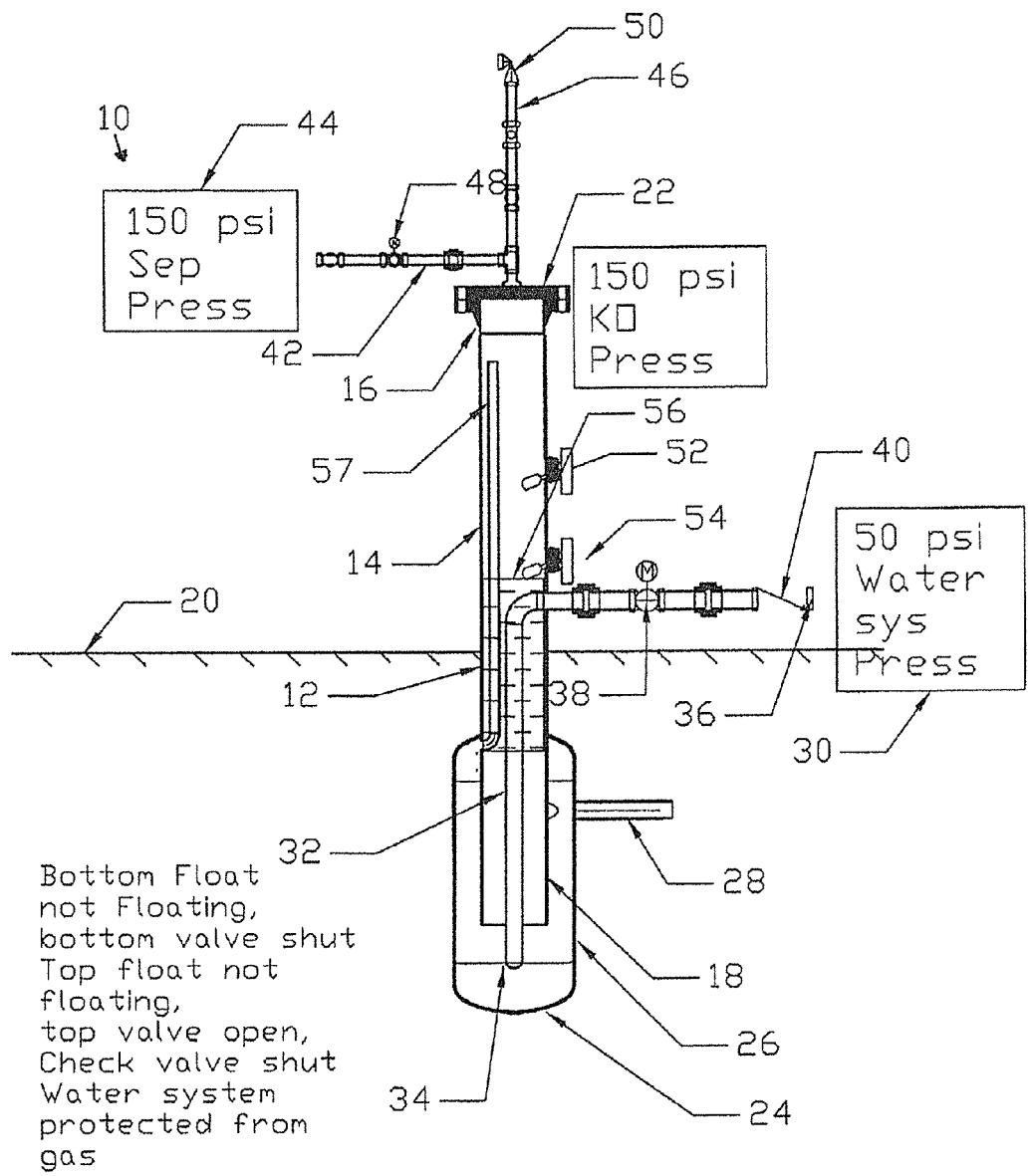
FIG. 5 shows the device of FIG. 1 in mode 2, i.e., wherein the gas pressure is higher than the liquid pressure, wherein the bottom float is not floating, the water line motor valve is closed, the top float is not floating, the gas line motor valve is open, and the water line non-return valve is closed.
Figure 6:
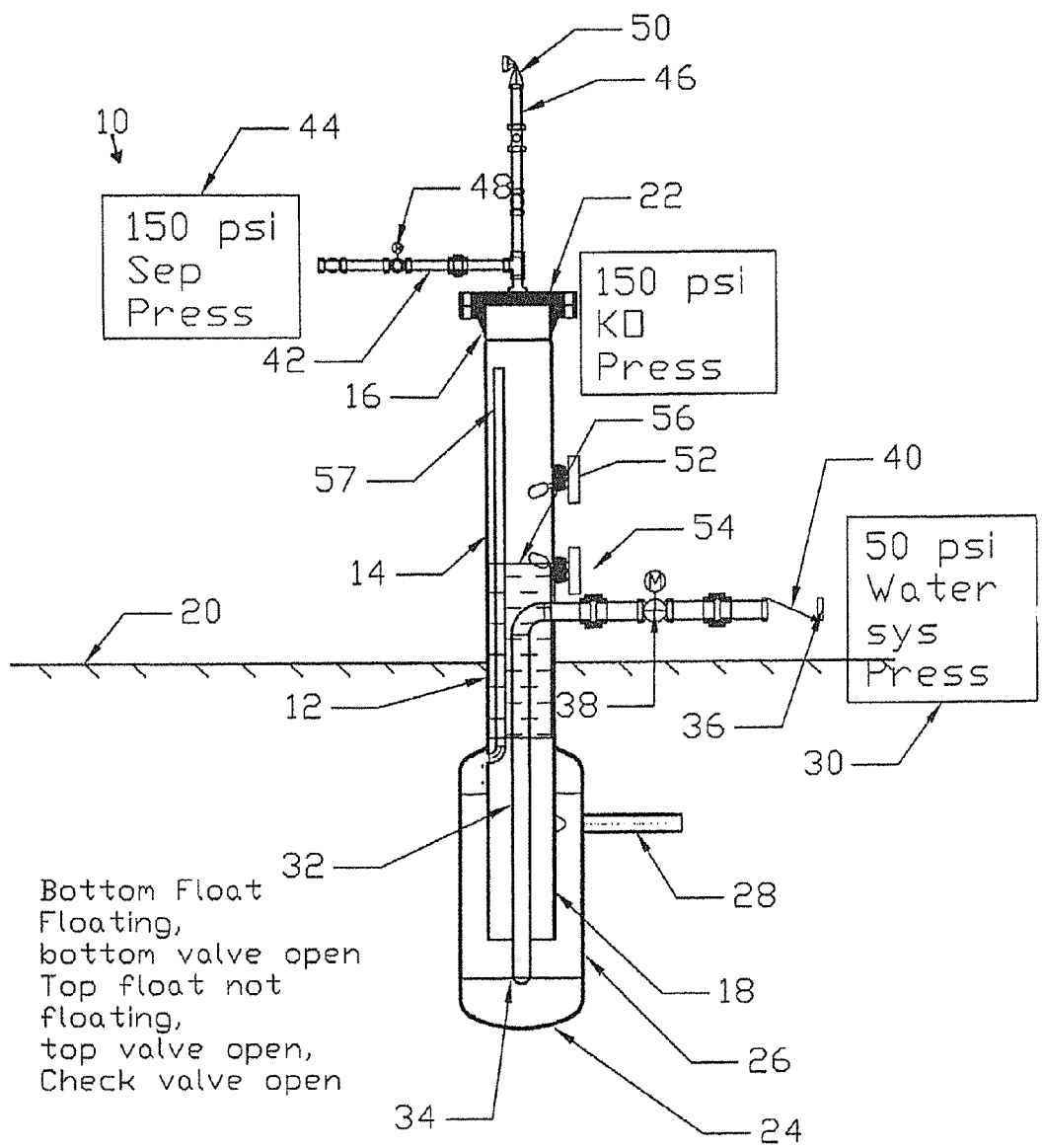
FIG. 6 shows the device of FIG. 1 in mode 2, i.e., wherein the gas pressure is higher than the liquid pressure wherein the bottom float is floating, the water line motor valve is open, the top float is not floating, the gas line motor valve is open, and the water line non-return valve is open.

In practice, there are two modes of operation, i.e., one mode wherein a liquid system pressure is higher than a gas system pressure (FIGS. 1-4), and a second mode wherein a gas system pressure is higher than a liquid system pressure (FIGS. 5, 6). The first mode, i.e., wherein the liquid system pressure is higher than a gas system pressure, will now be described. Referring now to FIGS. 1-4, a combined stream of liquid and gas is received in outer vessel 24 via tangential inlet passageway 28. Gas and liquid are separated from the combined stream in outer vessel 24 via rotating flow in outer vessel 24 due to the tangential flow direction of the stream due to tangential inlet passageway 28.

Gas is collected in upper end 16 of inner vessel 12 through a standpipe 57 to a location above gas/liquid interface 56. Gas line 42 is in communication with upper end 16 of inner vessel 12.

Figure 2:
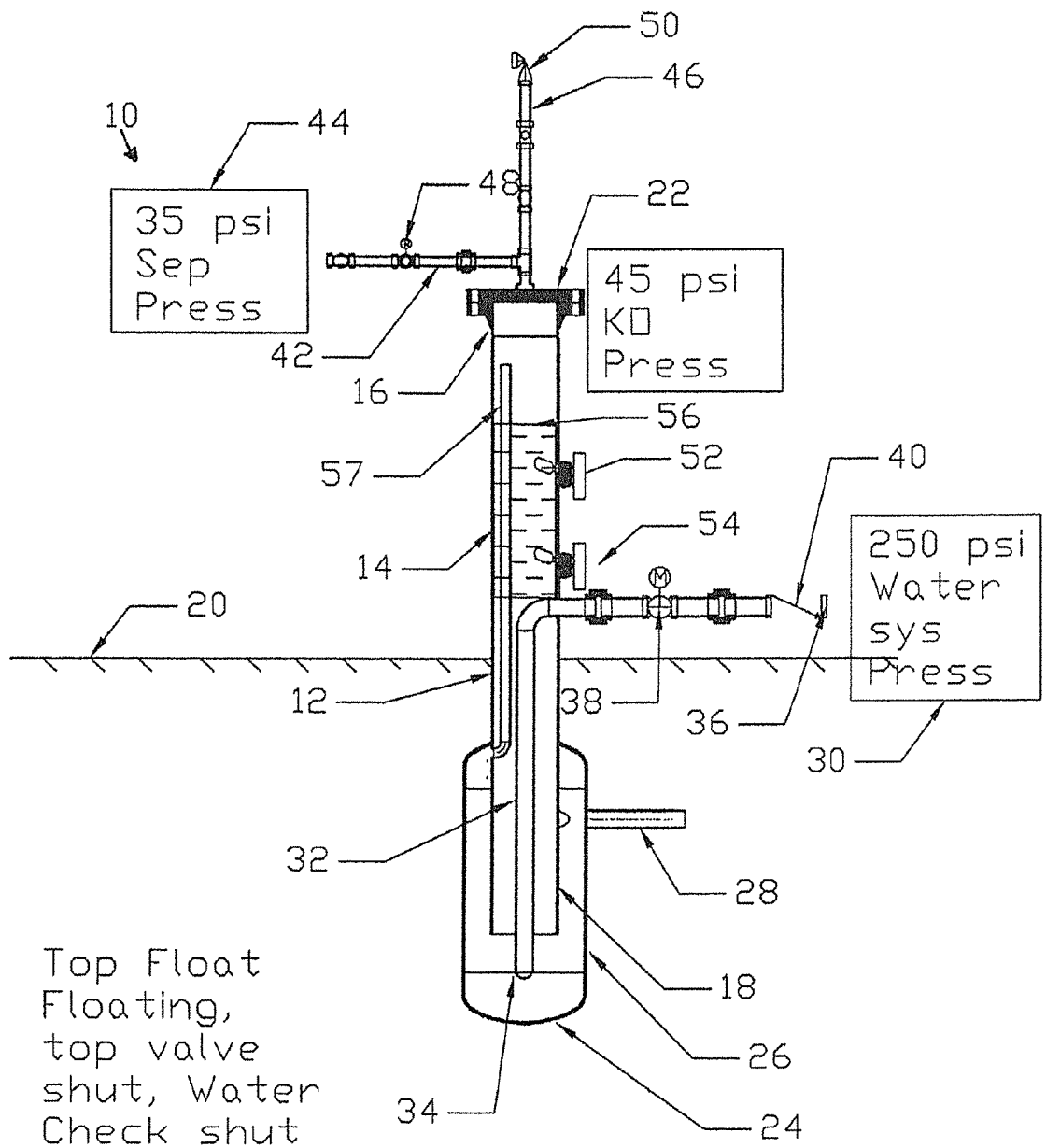
FIG. 2 shows the device of FIG. 1 in mode 1, i.e., wherein the liquid pressure is higher than the gas pressure, wherein the top float is floating, the gas line motor valve is closed and the water line non-return valve is closed.
Figure 3:
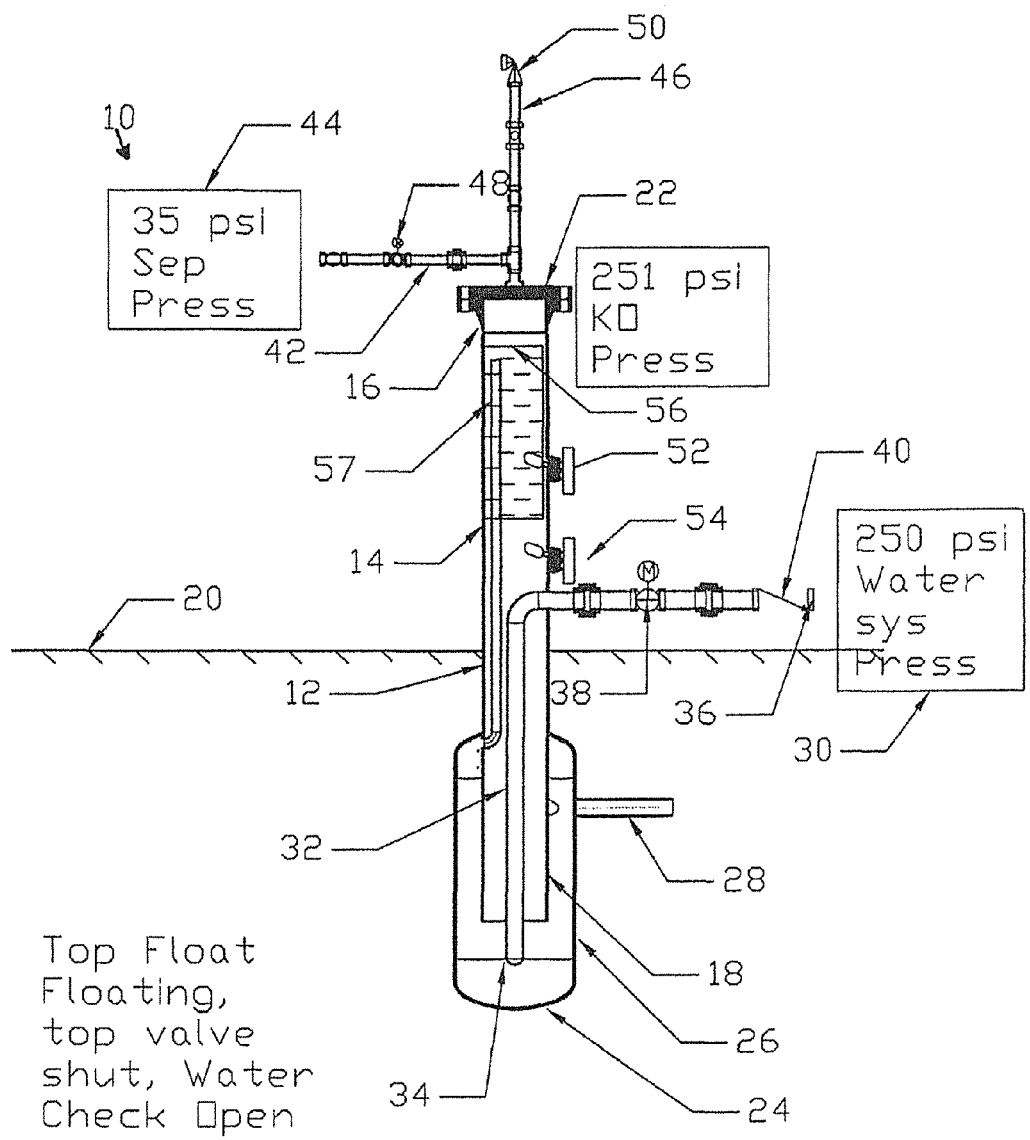
FIG. 3 shows the device of FIG. 1 in mode 1, i.e., wherein the vessel pressure is higher than the water line pressure, wherein the top float is floating, the gas line motor valve is closed, and the water line non-return valve is open.

As shown in FIG. 1, top float 52 is located in inner vessel 12 and is in a floating position. Gas line motor valve 48, located in gas line 42, is in a closed configuration, trapping gas in upper end 16 of inner vessel 12. As more gas and liquid is collected, gas/liquid interface 56 rises above top float 52 and top float 52 maintains a floating position (FIG. 2). Pressure within device 10 will also rise, e.g., from 35 psi (FIGS. 1) to 45 psi (FIG. 2). As the gas/liquid interface 56 continues to rise, pressure within device 10 will continue to rise, e.g., from 45 psi (FIGS. 2) to 251 psi (FIG. 3) causing pressure within the device (e.g., 251 psi) to rise to a higher level than a pressure in liquid piping 30 (e.g., 250 psi). Non-return valve 40, therefore, opens to permit liquids to flow into liquid piping 30. As liquids flow into liquid piping 30, liquid/gas interface 56, therefore, drops to a level below top float 52 (FIG. 4) so that top float 52 achieves a non-floating position (FIG. 4). Gas line motor valve 48 in gas line 42 moves to an open position (FIG. 4) in response to movement of top float 52 to a non-floating position. Gas then can flow through gas line 42 to gas collection system 44, which results in a substantial pressure drop within device 10.

If liquid intake is sufficiently high, liquid may again rise to a level where gas/liquid interface 56 is adjacent to top float 52 (FIG. 1). In this state, top float 52 is floated by the liquid. Gas line motor valve 48 then shuts in response to the floating of top float 52. At this time, the collecting of gas in the closed upper end 16 of inner vessel 12 can resume and the liquid level, i.e., the gas/liquid interface 56, can begin to rise once more.

The second mode of device 10, i.e., wherein the gas system pressure is higher than the liquid system pressure, will be discussed below. Referring to FIGS. 5 and 6, a combined stream is received in outer vessel 24 via tangential inlet passageway 28. Gas and liquid are separated from the combined stream in outer vessel 24 via rotating flow in outer vessel 24 due to a tangential flow path due to tangential inlet passageway 28. Gas is collected at a upper end 16 of inner vessel 12 through standpipe 57 above gas/liquid interface 56 and is passed to gas collection system 44 through open gas line motor valve 48 in gas line 42 (FIG. 5). When the liquid rises to a level where gas/liquid interface 56 is adjacent to bottom float 54, bottom float 54 is floated by liquid (FIG. 6). In response to the floating of bottom float 54, liquid line motor valve 38 is opened. The liquid is then forced through open liquid line motor valve 38 in liquid line 32 until gas/liquid interface 56 lowers to a level where bottom float 54 moves to a non-floating position. A liquid line motor valve 38 in liquid line 32 is then closed in response to movement of bottom float 54 to the non-floating position, thereby protecting liquid piping 30 from incursion of gas via liquid line 32.

Figure 7:
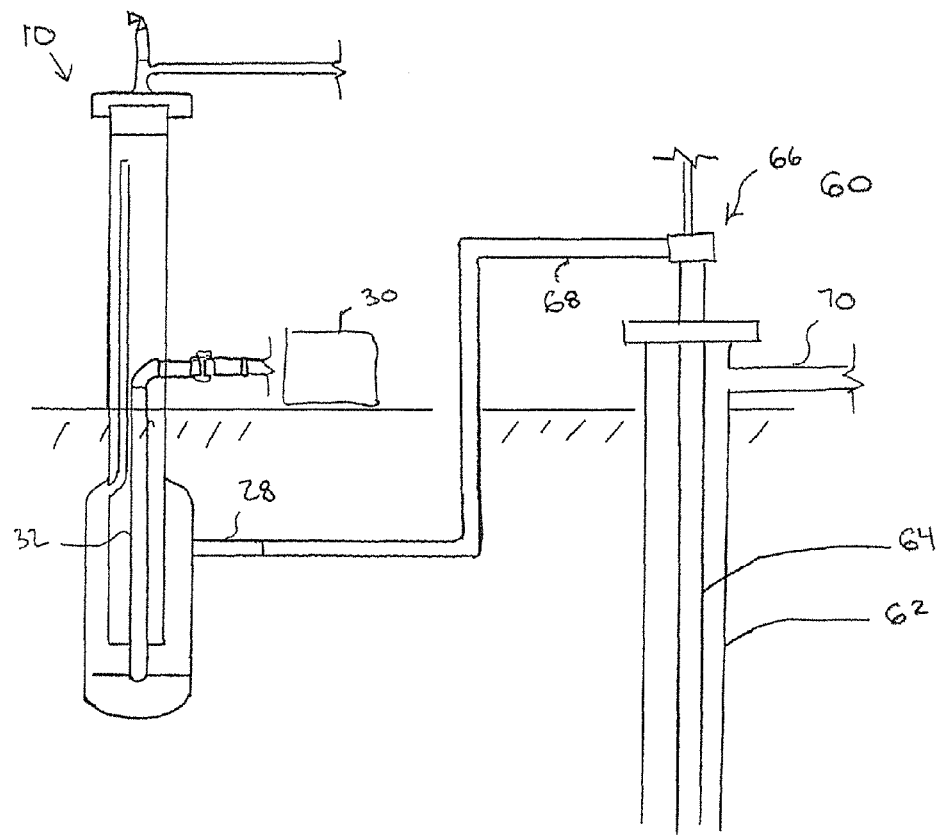
FIG. 7 shows the device of FIG. 1 installed at a well site with a down hole pump.

Referring now to FIG. 7, shown is device 10 installed at a well site having a downhole pump. The well site includes wellhead 60, from which casing 62 extends downwardly into the earth. Tubing 64 extends downwardly into casing 62 from tee 66. Tubing line 68, i.e., the pump discharge line, communicates tee 66 with inlet passageway 28 of device 10. Gas line 70 communicates with an annulus between casing 62 and tubing 64 for delivering gas to a gas recipient. Degassified water is discharged from liquid line 32 to liquid piping 30, which may include a tank or a produced water gathering system.

Figure 8:
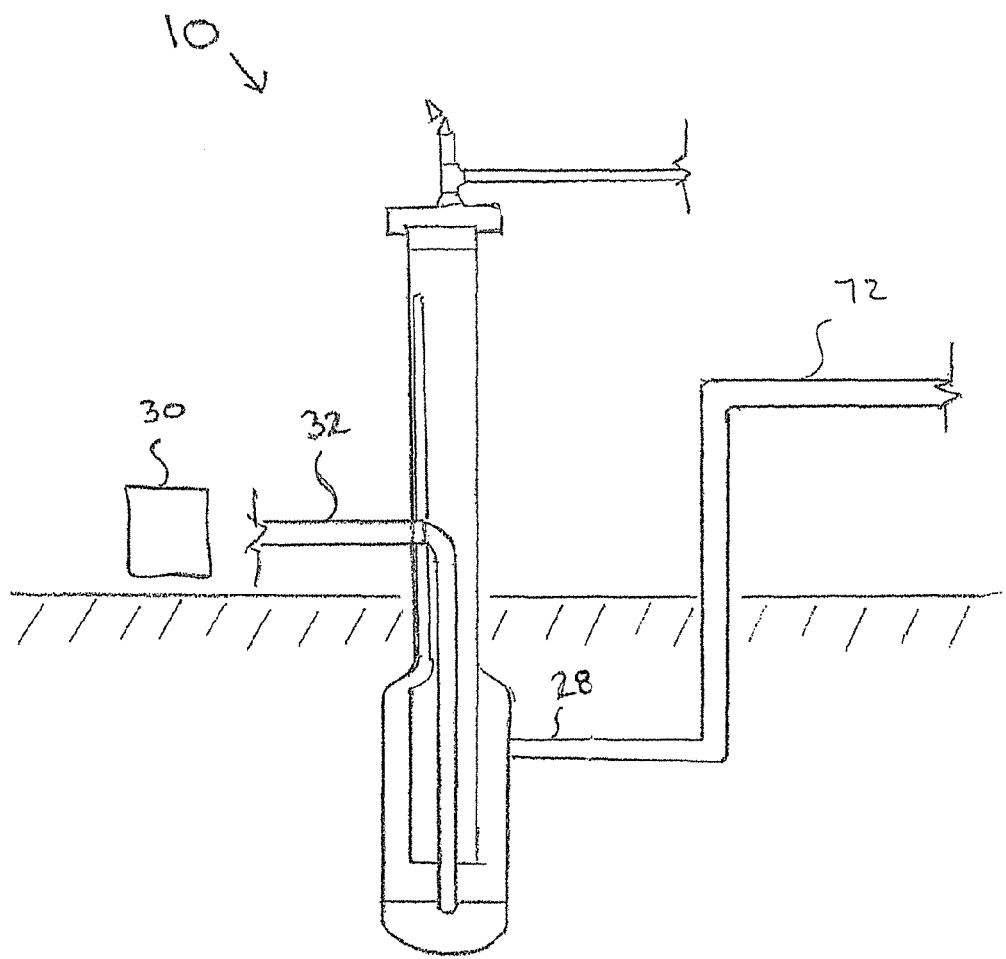
FIG. 8 shows the device of FIG. 1 installed in an in-line water gathering system.

Referring now to FIG. 8, shown is device 10 installed in line with produced water pipe 72, which communicates with inlet passageway 28 of device 10. Degassified water is discharged from liquid line 32 to liquid piping 30, which may include a tank or a produced water gathering system.

Figure 9:
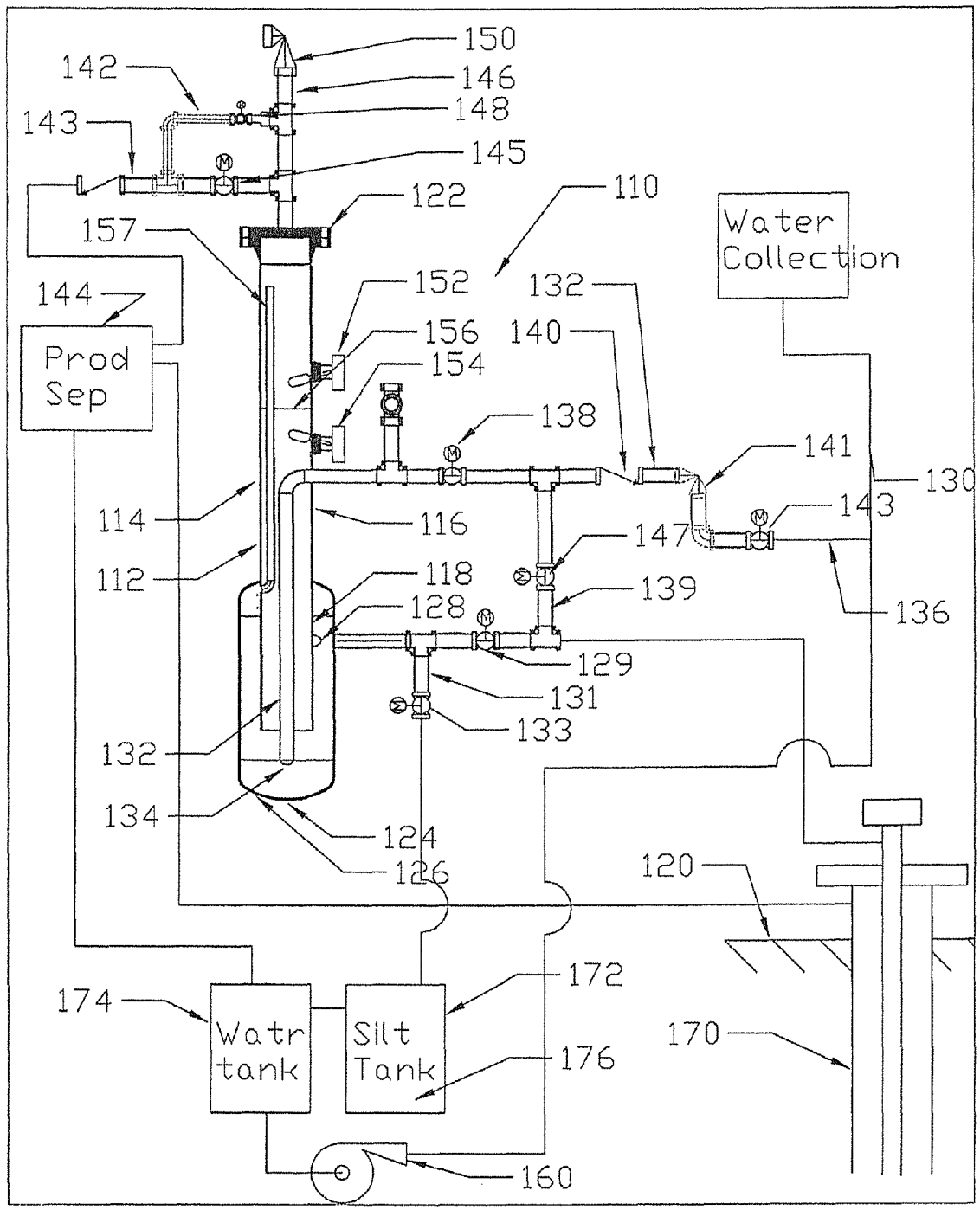
FIG. 9 shows an embodiment of the device modified for desilting.

Referring now to FIG. 9, shown is a modified gas capturing device 110 suitable for removing sand, silt, and coal fines from produced water. Device 110 includes an inner vessel 112 having sidewall 114, upper portion 116 and a lower portion 118. Inner vessel 112 extends downwardly from a tangential entry of inlet passageway 128. A cap member 122 is provided on upper portion 116 of inner vessel 112.

A cylindrical outer vessel 124 has a housing 126 having a diameter greater than a diameter of inner vessel 112. Outer vessel 124 receives lower portion 118 of inner vessel 112 in a top portion of outer vessel 124.

An inlet passageway 128 is tangentially oriented with respect to outer vessel 124. Inlet passageway 128 extends through housing 126 of outer vessel 124 for admitting a combined gas and liquid stream into outer vessel 124. Inlet passageway 128 is provided with a normal inlet valve 129. Backflow passageway 131 connects with inlet passageway between normal inlet valve 129 and outer vessel 124. Backflow outlet valve 133 is provided on backflow passageway 131.

Liquid is collected in liquid piping 130 from the bottom of outer vessel 124. Liquid piping 130 may lead to or include a tank or water gathering system. Liquid line 132 passes through side wall 114 of inner vessel 112 and down through inner vessel 112 into outer vessel 124. Liquid line 132 forms a stinger 134 that extends below inlet passageway 128 so that gas separated from the combined stream will flow up outer vessel 124 above gas/liquid interface 156 through standpipe 157 to the top of inner vessel 112. Liquid line 132 has an exit end 136 that communicates with liquid piping 130. A normal water outlet valve 138 is provided in liquid line 132. A non-return valve 140 is also provided in liquid line 132 to prevent liquid from liquid piping 130 from flowing back into outer vessel 124. Angle valve 141 is installed between non-return valve 140 and skid water outlet valve 143 to maintain required operating pressure.

Bypass line 139 communicates liquid line 132 and inlet passageway 128. Bypass valve 147 is located on bypass line 139 to control flow therethrough.

A gas line 142 extends from cap member 122 on upper end 116 of inner vessel 112. Gas line 142 is provided for conveying gas from upper end of upper portion 116 of inner vessel 112 to gas collection system 144, which can be either a production separator, the wellhead annulus, or a gas collection system. Gas vent line 143 connects upper end of device 110 with gas collection 144. Gas vent valve 145 controls flow from device 110 into gas vent line 143 in the event of a large slug of gas. A pressure relief line 146 is in communication with upper end of upper portion 116 of inner vessel 112. A gas line motor valve 148 is provided in gas line 142 to exhaust normal gas slugs. A pressure relief valve 150 is provided in pressure relief line 146.

Top float 152 is provided in inner vessel 112 for activating gas line motor valve 148 and a bottom float 154 is provided in inner vessel 112 for activating liquid line motor valve 138 and gas line motor valve 145.

To flush vessel 124, gas vent valve 145 and 148 are closed. Normal water outlet valve 138 is opened. Bypass valve 147 is opened. Normal inlet valve 129 is closed. Backflush outlet valve 133 is opened. Skid water outlet valve 143 is closed. Backflow from downhole wellbore pump 170 enters through bypass valve 147 through normal outlet valve 138 and exits the stinger 134 to jet produced water into the bottom of outer vessel 124. Disturbed solids and produced water move up the annulus between outer vessel 124 and lower end 118 of inner vessel 112 and out the tangential entry of inlet passageway piping 128. The liquid/solid mixture then travels through backflush outlet valve 133 to the silt tank 172. Water is skimmed off silt tank 172 into the produced water tank 174. Water from produced water tank 174 is pumped using pump 160 into water collection system. Solids 176 in silt tank 172 are removed with vacuum equipment. Flow is permitted for a preset volume, typically between 200 and 1000 gallons, which concludes the flush.

Next, skid water outlet valve 143 is opened. Backflush outlet valve 133 is closed. Normal inlet valve 129 is opened. Bypass valve 147 is closed. Normal water outlet valve 138 is returned to level control. Gas vent valves 145 and 148 are returned to level control.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A flushable device for collecting gas and liquid from a well comprising:
   an inner vessel having a sidewall, an upper end and a lower end;
   a gas/liquid separator receiving said lower end of said inner vessel, said gas/liquid separator having an inlet line for admitting a combined stream into said gas/liquid separator;
   a liquid line passing through said sidewall of said inner vessel and down through said inner vessel into said gas/liquid separator, said liquid line forming a stinger that extends below said inlet line of said gas/liquid separator so that liquid separated from said combined stream will flow up said liquid line, said liquid line having an exit end;
   a liquid line motor valve in said liquid line;
   a gas line and gas vent extending from said upper end of said inner vessel, said gas line in communication with a gas collection system for conveying gas from said upper end of said inner vessel to said gas collection system;
   a gas line motor valve in said gas line;
   a top float in said inner vessel for activating said gas line motor valve;
   a bottom float in said inner vessel for activating said liquid line motor valve;
   a bypass line communicating said liquid line and said inlet line;
   a bypass valve located on said bypass line for selective closing of said bypass line;
   a backflow passageway in communication with said inlet line;
   wherein said bypass valve is selectively opened to permit backflow from the well to pass through said inlet line, said bypass line and said liquid line for flushing said gas/liquid separator.

2. The device according to claim 1 wherein said gas/liquid separator comprises:
   an outer vessel having a housing with an inside diameter greater than an outside diameter of said inner vessel, said outer vessel receiving said lower end of said inner vessel in a top portion of said outer vessel.

3. The device according to claim 2 wherein:
   said inlet comprises an inlet passageway tangentially oriented with respect to said outer vessel, said inlet passageway extending through said housing of said outer vessel for admitting said combined stream into said outer vessel.

4. The device according to claim 2 further comprising:
   a gas standpipe having a lower end at a top of an annulus between said inner vessel and said outer vessel, said gas standpipe having an upper end that terminates near said upper end of said inner vessel.

5. The device according to claim 1 further comprising:
   liquid piping for collecting liquid from said gas/liquid separator via said exit end of said liquid line.

6. The device according to claim 5 further comprising:
   a non-return valve in said liquid line for preventing liquid from said liquid piping from flowing back into said gas/liquid separator.

7. A well site comprising:
   a well head having a tubing line extending therefrom;
   a device having an inner vessel having a sidewall, an upper end and a lower end;
   a gas/liquid separator receiving said lower end of said inner vessel, said gas/liquid separator having an inlet line in communication with said tubing line for admitting a combined stream into said gas/liquid separator;
   a liquid line passing through said sidewall of said inner vessel and down through said inner vessel into said gas/liquid separator, said liquid line forming a stinger that extends below said inlet line of said gas/liquid separator so that liquid separated from said combined stream will flow up said liquid line, said liquid line having an exit end;
   a liquid line motor valve in said liquid line;
   a gas line extending from said upper end of said inner vessel, said gas line in communication with a gas collection system for conveying gas from said upper end of said inner vessel to said gas collection system;
   a gas line motor valve in said gas line;
   a top float in said inner vessel for activating said gas line motor valve;
   a bottom float in said inner vessel for activating said liquid line motor valve;
   a bypass line communicating said liquid line and said inlet line;
   a bypass valve located on said bypass line for selective closing of said bypass line;
   a backflow passageway in communication with said inlet line;
   wherein said bypass valve is selectively opened to permit backflow from the well to pass through said inlet line, said bypass line and said liquid line for flushing said gas/liquid separator.

8. The well site according to claim 7 wherein said gas/liquid separator comprises:
   an outer vessel having a housing with an inside diameter greater than an outside diameter of said inner vessel, said outer vessel receiving said lower end of said inner vessel in a top portion of said outer vessel.

9. The well site according to claim 8 wherein:
   said inlet comprises an inlet passageway tangentially oriented with respect to said outer vessel, said inlet passageway extending through said housing of said outer vessel for admitting said combined stream into said outer vessel.

10. The well site according to claim 8 further comprising:
    a gas standpipe having a lower end at a top of an annulus between said inner vessel and said outer vessel, said gas standpipe having an upper end that terminates near said upper end of said inner vessel.

11. The well site according to claim 9 further comprising:
    liquid piping for collecting liquid from said gas/liquid separator via said exit end of said liquid line.

12. The well site according to claim 11 further comprising:
    a non-return valve in said liquid line for preventing liquid from said liquid piping from flowing back into said gas/liquid separator.

13. The well site according to claim 7 wherein:
    said inner vessel extends downwardly from said inlet.

14. In a device for collecting gas and liquid from a well, said device for receiving a combined stream of liquid and gas in an outer vessel, separating gas and liquid from said combined stream in said outer vessel, collecting said gas in an upper portion of an inner vessel to a location above a gas/liquid interface, locating a top float in said inner vessel for responding to a level of said gas/liquid interface, locating a bottom float in said inner vessel for responding to a level of said gas/liquid interface, a method for flushing the device comprises the steps of:

closing a gas vent valve;
opening a water outlet line;
opening a bypass line that communicates said water outlet line and a liquid inlet line;
flushing water into the outer vessel through said water outlet line to flush said outer vessel.

15. The method according to claim 14 wherein:
said step of flushing utilizes between 200 and 1000 gallons.

* * * * *